(12) United States Patent
Mizoguchi

(10) Patent No.: US 8,120,739 B2
(45) Date of Patent: Feb. 21, 2012

(54) LCD DEVICE INCLUDING AN INSULATOR FILM HAVING A CONTACT HOLE FOR EXPOSING A PIXEL ELECTRODE

(75) Inventor: Chikaaki Mizoguchi, Kanagawa (JP)

(73) Assignee: NLT Technologies, Ltd., Kawasaki, Kanagawa (JP)

( * ) Notice: Subject to any disclaimer, the term of this patent is extended or adjusted under 35 U.S.C. 154(b) by 73 days.

(21) Appl. No.: 11/878,371

(22) Filed: Jul. 24, 2007

(65) Prior Publication Data

US 2008/0024688 A1    Jan. 31, 2008

(30) Foreign Application Priority Data

Jul. 25, 2006 (JP) ................................. 2006-201392

(51) Int. Cl.
*G02F 1/1343* (2006.01)
*G02F 1/1333* (2006.01)

(52) U.S. Cl. ........................................ 349/141; 349/162
(58) Field of Classification Search .................. 349/139, 349/141, 142, 145, 84
See application file for complete search history.

(56) References Cited

U.S. PATENT DOCUMENTS

| | | | | |
|---|---|---|---|---|
| 5,905,556 A * | 5/1999 | Suzuki et al. | ................. | 349/141 |
| 5,969,782 A * | 10/1999 | Lee et al. | ..................... | 349/141 |
| 6,069,678 A * | 5/2000 | Sakamoto et al. | ............ | 349/141 |
| 6,088,078 A * | 7/2000 | Kim et al. | ..................... | 349/141 |
| 6,392,731 B1 * | 5/2002 | Satake et al. | ................. | 349/141 |
| 6,452,657 B1 * | 9/2002 | Suzuki et al. | ................. | 349/141 |
| 6,509,939 B1 * | 1/2003 | Lee et al. | ......................... | 349/39 |
| 6,630,979 B2 * | 10/2003 | Yang | .............................. | 349/141 |
| 6,671,019 B1 * | 12/2003 | Petschek et al. | .............. | 349/129 |
| 6,803,979 B2 * | 10/2004 | Yoo et al. | ......................... | 349/84 |
| 6,885,424 B2 * | 4/2005 | Yoo | ................................. | 349/141 |
| 2004/0135954 A1 * | 7/2004 | Kim et al. | ..................... | 349/141 |
| 2005/0078257 A1 * | 4/2005 | Lee et al. | ..................... | 349/141 |
| 2007/0296901 A1 * | 12/2007 | Seo et al. | ..................... | 349/141 |

FOREIGN PATENT DOCUMENTS

| | | |
|---|---|---|
| JP | 9-311334 | 12/1997 |
| JP | 2001-027764 A | 1/2001 |
| JP | 2001-330842 A | 11/2001 |
| JP | 2002-296607 A | 10/2002 |
| JP | 2004-054090 A | 2/2004 |

OTHER PUBLICATIONS

Japanese Office Action dated Oct. 11, 2011 with an English translation.

* cited by examiner

*Primary Examiner* — Mark Robinson
*Assistant Examiner* — Robert Tavlykaev
(74) *Attorney, Agent, or Firm* — McGinn IP Law Group, PLLC

(57) ABSTRACT

A liquid crystal display (LCD) device includes first and second substrates, a liquid crystal (LC) layer sandwiched between the first substrate and the second substrate, the first substrate defining an array of pixel areas, each of the pixel areas including a pixel electrode and a common electrode, and an insulator film formed on the first substrate and on the pixel electrode, the insulator film including a contact hole and the pixel electrode being exposed through the contact hole such that a voltage supplied to the pixel electrode generates a radial electric field around the contact hole and between the pixel electrode and the common electrode.

20 Claims, 10 Drawing Sheets

LCD DEVICE INCLUDING AN INSULATOR FILM HAVING A CONTACT HOLE FOR EXPOSING A PIXEL ELECTRODE

This application is based upon and claims the benefit of priority from Japanese patent application No. 2006-201392, the disclosure of which is incorporated herein in its entirety by reference.

BACKGROUND OF THE INVENTION (a) Field of the Invention

The present invention relates to a lateral-electric-field-mode liquid crystal display (LCD) device and, more particularly, to a LCD device wherein liquid crystal (LC) molecules in a LC layer are rotated in a plane parallel to both the surface of the substrates sandwiching therebetween the LC layer.

(b) Description of the Related Art

Active-matrix (AM) LCD devices are known in the art wherein active elements, such as thin-film-transistors (TFTs), are used as switching devices for controlling respective pixels. The AM LCD device has a high-definition image quality, and is widely used as a monitor of a desktop computer, etc. Typical operational modes of the LCD device include: a twisted-nematic (TN) mode in which the LC molecules (or directors) of the LC layer are rotated in a plane perpendicular to the surface of both the substrates; and a lateral-electric-field mode, such as in-plane-switching (IPS) mode, in which the LC molecules are rotated in a plane parallel to the surface of both the substrates.

In each pixel of the IPS-mode LCD device, the pixel electrode and common electrode extend parallel to each other on a glass substrate (or transparent substrate) configuring a TFT panel or active-matrix panel. Upon display of an image, a drive voltage is applied between the pixel electrode and the common electrode, to generate a lateral electric field parallel to the substrate surface. The lateral electric field rotates the directors of the LC layer to control the amount of light passed by the LC layer. Due to this rotational direction of the directors, the IPS-mode LCD device is substantially free from the problem that the relationship between the amount of the transmitted light and the applied voltage is different between the direction normal to the substrate surface and the alignment direction of the directors of the LC. Thus, the IPS-mode LCD device has a higher image quality in a wider viewing angle.

Generally, the IPS-mode LCD device has the configuration wherein a homogeneously-aligned LC layer is sandwiched between a pair of transparent substrates to form a LC element, which is in turn sandwiched between a pair of polarizing films. The polarizing films have polarization axes (such as optical transmission axes or optical absorption axes) extending perpendicular to each other. In the IPS-mode LCD device, a typical configuration is such that the polarization axis of one of the polarizing films is set substantially parallel to the alignment direction of the LC molecules, whereby absence of an applied voltage provides a dark state and presence of the applied voltage rotates the LCD molecules to provide a bright state. This configuration allows the brightness of the LCD device to be stable upon display of the dark state.

Although the IPS-mode LCD device can realize a higher viewing angle characteristic, there is a problem that a coloring phenomenon occurs upon display of a bright state as viewed in a slanted direction. This results from the fact that both the pixel electrode and common electrode are substantially linear to thereby rotate the LC molecules in a single rotational direction. Patent Publication JP-1997-311334A proposes a solution of this problem, wherein both the pixel electrode and common electrode are provided with a bent having a shape of dogleg.

FIG. 9 shows the structure of the pixel of the conventional IPS-mode LCD device in a top plan view, whereas FIG. 10 shows a sectional view thereof taken along line X-X in FIG. 9. The LCD device, generally designated at numeral 200, includes a first transparent substrate (glass substrate) 222 on which TFTs are formed, a second transparent substrate 213 on which color filters are formed, and a LC layer 218 sandwiched between these substrates. On the first transparent substrate 222, gate electrodes 201 and data lines 202 extend perpendicularly to one another, and TFTs 204 are disposed at respective intersections.

The TFTs are controlled for ON or OFF depending on the potential of the gate electrode 201 underlying the gate insulation film 221. The source of TFTs 204 is connected to a data line 202 via a source electrode 203, and the drain thereof is connected to a drain electrode 205. The drain electrode 205 is made of a metallic film underlying a planarization film (overcoat) 220, and connected to the pixel electrode 206 configured as a transparent electrode on the overcoat 220 via a contact hole. The common electrode 207 includes a lead portion or trunk line made of a metallic film underlying the overcoat 220, and a transparent portion disposed within the pixel and connected to the trunk line via a contact hole.

A pair of shield lines 208 made of a transparent film overlie both the edge portions of the data line 202 for shielding the LC layer 218 against the electric field generated by the data line 20. The shield lines 208 are connected to the trunk line of the common electrode 207 underlying the overcoat 220 via a contact hole. In each pixel, the pixel electrode 206 and common electrode 207 have a dogleg bent at the substantially center of the electrodes, and extend parallel to each other at each of the linear portions of the electrodes. On the second transparent substrate 213, there are formed a black matrix film 215 for defining the pixel area, color layers 214 for representing RGB colors, and an overcoat 216 covering these underlying layers. In addition, a conductive film 212 is also provided on the surface of the second transparent substrate 213 far from the LC layer 218, for reducing the vertical electric field within the LC layer 218.

Alignment films 219 and 217 are formed by coating on the surface of the first and second transparent substrates near the LC layer, for determining the initial orientation of the LC molecules. The LC layer 218 is homogeneously aligned in the direction 210 parallel to the extending direction of the data lines 202. The polarizing films 211 and 223 bonded onto the outer surface of the first and second transparent substrates 222 and 213, respectively. The polarization axes of these polarizing films 211 and 223 intersect substantially at right angles, and one of the polarization axes is parallel to the initial orientation of the LC molecules in the LC layer 218. In operation of the LCD device, a data signal is provided to the pixel electrode 206 to apply a lateral electric field to the LC layer between the pixel electrode 206 and the common electrode 207, whereby the directors of the LC layer are rotated to display an image on the screen.

In the LCD device 200 of FIG. 9, when a drive voltage is applied between the pixel electrode 206 and the common electrode 207, the two linear portions provided at both sides of the dogleg bent generate an electric field in different directions, whereby the LC directors (LC molecules) are rotated in different directions. In the example of FIG. 9, the LC directors 209 in the first region shown at the top side of the drawing are rotated in the counter-clockwise direction, whereas the LC directors 209 in the second region shown at the bottom side of the drawing are rotated in the clockwise direction, as shown in the drawing. In this case, the LCD device 200, upon displaying a bright state, assumes different colors as viewed in a slanted direction, whereby both the first and second regions compensate each other to reduce the coloring of the LCD device.

The inventor analyzed problems of the conventional IPS-mode LCD device as described above. The dogleg bent formed in the pixel electrode 206 and common electrode 207 causes that the extending direction of the electrodes is not parallel to the orientation of the LC directors, whereby the rubbing treatment of the alignment film is not parallel to the extending direction of the electrodes. The step difference formed on the surface of the alignment film by the presence and absence of the electrodes may incur an obstacle against a smooth rubbing treatment, to cause an uneven surface of the alignment film. The uneven surface reduces the contrast ratio of the LCD device. In addition, the uneven surface may incur a dead space between the pattern of the TFT substrate and the counter substrate, thereby reducing the effective aperture ratio of each pixel. Furthermore, a deviation in the angle between the optical axis of the polarizing films and the extending direction of the electrodes causes an optical diffraction at the edge of the electrodes, deviates the direction of polarization to generate leakage light, and thus reduces the contrast ratio.

SUMMARY OF THE INVENTION

In view of the above, it is an object of the present invention to provide a LCD device solving the above problem and having a smaller leakage light, a higher effective aperture ratio and a higher contrast ratio.

The present invention provides a liquid crystal display (LCD) device including: first and second substrates; and a liquid crystal (LC) layer sandwiched between the first substrate and the second substrate, the first substrate defining an array of pixel areas, each of the pixel areas receiving therein a pixel electrode and a common electrode, at least one of the pixel electrode and the common electrode including a control electrode generating a radial electric field between the control electrode and the other of the pixel electrode and the common electrode.

The above and other objects, features and advantages of the present invention will be more apparent from the following description, referring to the accompanying drawings.

PREFERRED EMBODIMENT OF THE INVENTION

Figure 1:
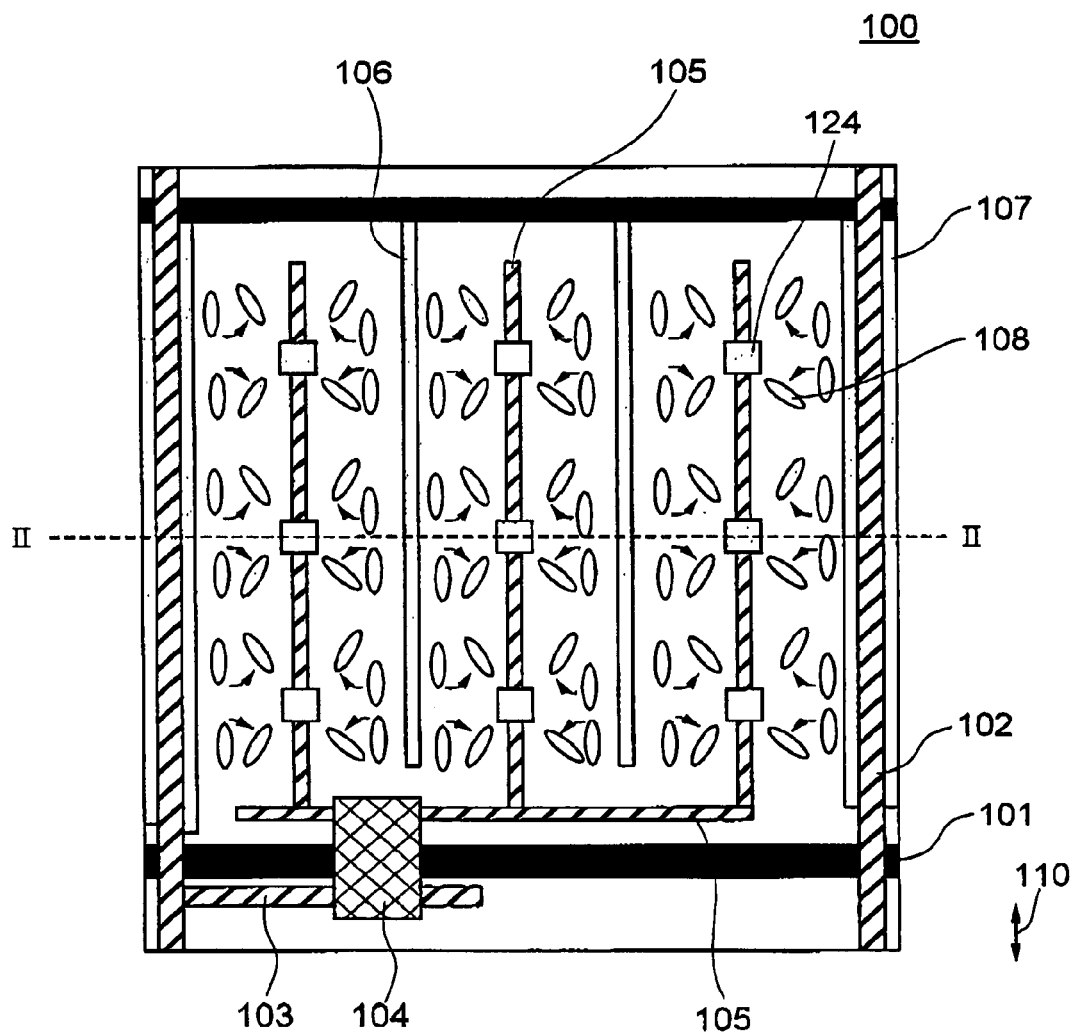
FIG. 1 is a top plan view showing the arrangement of electrodes in the pixel of a LCD device according to a first embodiment of the present invention.

Now, exemplary embodiments of the present invention will be described with reference to accompanying drawings, wherein similar constituent elements are designated by similar reference numerals.

Figure 2:
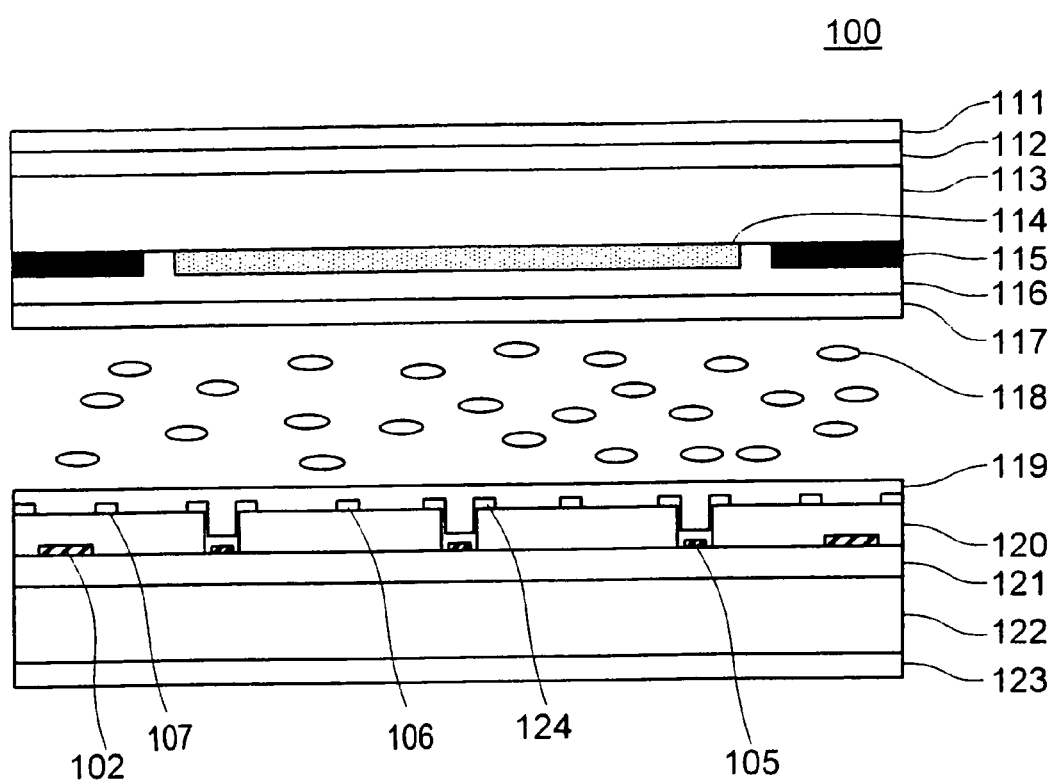
FIG. 2 is a sectional view taken along line II-II in FIG. 1.

FIG. 1 shows the arrangement of electrodes in the pixel of a LCD device according to a first embodiment of the present invention in a top plan view, and FIG. 2 shows a sectional view taken along line II-II in FIG. 1. The LCD device, generally designated at numeral 100, includes a first transparent substrate (glass substrate) 122 on which TFTs are formed, a second transparent substrate 113 opposing the first transparent substrate, and a LC layer 118 disposed between both the substrates 122 and 113. The first transparent substrate 122 includes thereon a plurality of gate electrodes (gate lines) 101 extending in a row direction, a plurality of data lines 102 extending in a column direction, and an array of pixels and an array of associated TFTs 104 disposed in the vicinity of the intersections of the gate lines and data lines. One of the pixels and an associated TFT are shown in FIG. 1. Each pixel includes a pixel electrode 105 and a common electrode 106.

On the first transparent substrate 122 are consecutively formed a gate insulation film 121 and an overcoat 120. On the overcoat 120 is formed an alignment film 119 for defining the initial orientation of the LC layer 118. On the second transparent substrate 113 are formed a black matrix 115 shielding the gap between the effective pixel areas against light, color layers 114 and an overcoat 116, which are consecutively formed on the surface of the second transparent substrate 113 near the LC layer 118. On the overcoat 116 is also formed an alignment film 117 for defining the initial orientation of the LC layer 118. Polarizing films 123 and 111 are formed on the outer surface of the first and second transparent substrates 122 and 113, respectively. The polarization axes of the polarizing films 123 and 111 intersect each other at right angles, and the polarization axis of one of the polarizing films is parallel to the optic axis 110 of the LC molecules in the LC layer 118.

The common electrode 106 is of a comb shape including a trunk line made of a metallic film underlying the overcoat 120, and transparent branches connected to the trunk line and herein referred to as comb-teeth electrodes. The comb-teeth electrodes are connected to the trunk line via respective contact holes. A pair of shield lines 107-1-08 extend on the overcoat 120 while overlying both the edge portions of the data line 102. The shield lines 107 have a function of electromagnetic-shielding the LC layer against the electric field generated from the data line 102. The shield lines 107 include transparent electrodes connected to the trunk line of the comb-shaped common electrode via a contact hole.

The pixel electrode 105 is of a comb shape including a trunk line made of a metallic film underlying the overcoat 120, and transparent branches referred herein to as comb-teeth electrodes. The comb-teeth electrodes of the pixel electrode 105 are formed to underlie the overcoat 120 and extend parallel to and thus oppose the respective comb-teeth electrodes of the common electrode 106. The TFT 104 includes a gate electrode 101, and a source/drain path interposed between the data line 102 and the pixel electrode 105, whereby the TFT 104 writes data supplied from the data line 102 into the pixel electrode 105.

A plurality of control electrodes 124 of a rectangular shape are arranged to overlie each of the comb-teeth electrodes of the pixel electrode 105. The control electrodes 124 are made of a transparent conductive film connected to the corresponding comb-teeth electrode of the pixel electrode 105 via respective contact holes. The control electrodes 124 generate a radial electric field between the same and the common electrode 106, thereby separately controlling the LC directors 108 adjacent to the control electrodes to be directed along the radial electric field.

In operation, if the gate signal supplied to the gate electrode 101 turns the TFT 104 on, the TFT 104 delivers the data signal or drive voltage supplied from the data line 102 to the pixel electrode 105. The drive voltage is supplied to the control electrode 124 on the overcoat 120 via the contact hole. On the other hand, the common electrode 106 is applied with a common electrode voltage. Thus, a radial electric field is generated between the linear portion of the common electrode 106 and the point-like control electrode 124, thereby driving LC directors 108 in the direction along the radial electric field.

In each pixel of the LCD device 100, there are generated a first electric field between the pixel electrode 105 and the common electrode 106, and a second electric field between the control electrode 124 and the common electrode 106. The first electric field is parallel to the row direction, which is perpendicular to the optical axis of the LC layer 118 in the initial orientation, whereas the second electric field is a radial electric field around each control electrode 124. Since the pixel electrode 105 underlies the overcoat 120, and the control electrodes 124 and common electrode 106 are formed on the overcoat 124, the first electric field is weaker than the second electric field, whereby the rotational direction of the LC layer from the initial orientation is determined by the second electric field or radial electric field. This means the rotational direction of the LC layer is different between the locations of the LC molecules relative to the control electrodes 124, depending on which side the control electrodes 124 are located, i.e., top side or bottom side in the drawing. Thus, the arrangement of the rotational directions of the LC layer is determined by the pitch of the control electrodes 124 within the pixel. The pitch of the control electrodes 106 may be selected as desired, and the domain of the LC molecules having the same rotational direction can be selected so as to prevent the coloring of the layer.

In the present embodiment, as described above, the control electrodes 124 are applied with the potential applied to the pixel electrode 105, to generate a radial electric field between the same and the common electrode 106. The control electrodes 106 drive the LC directors 108 of the LC layer 118 in the radial direction of the control electrodes 106, whereby the rotational direction of the LC directors 108 is symmetric, with the control electrodes 124 being a point of symmetry. A smaller pitch of the control electrodes 124 allows the coloring caused by the rotation of the LC directors 108 to be more compensated between the different directions of the LC directors 108. Thus, the smaller pitch improves the uniformity of the image as observed in different viewing angles.

Figure 9:
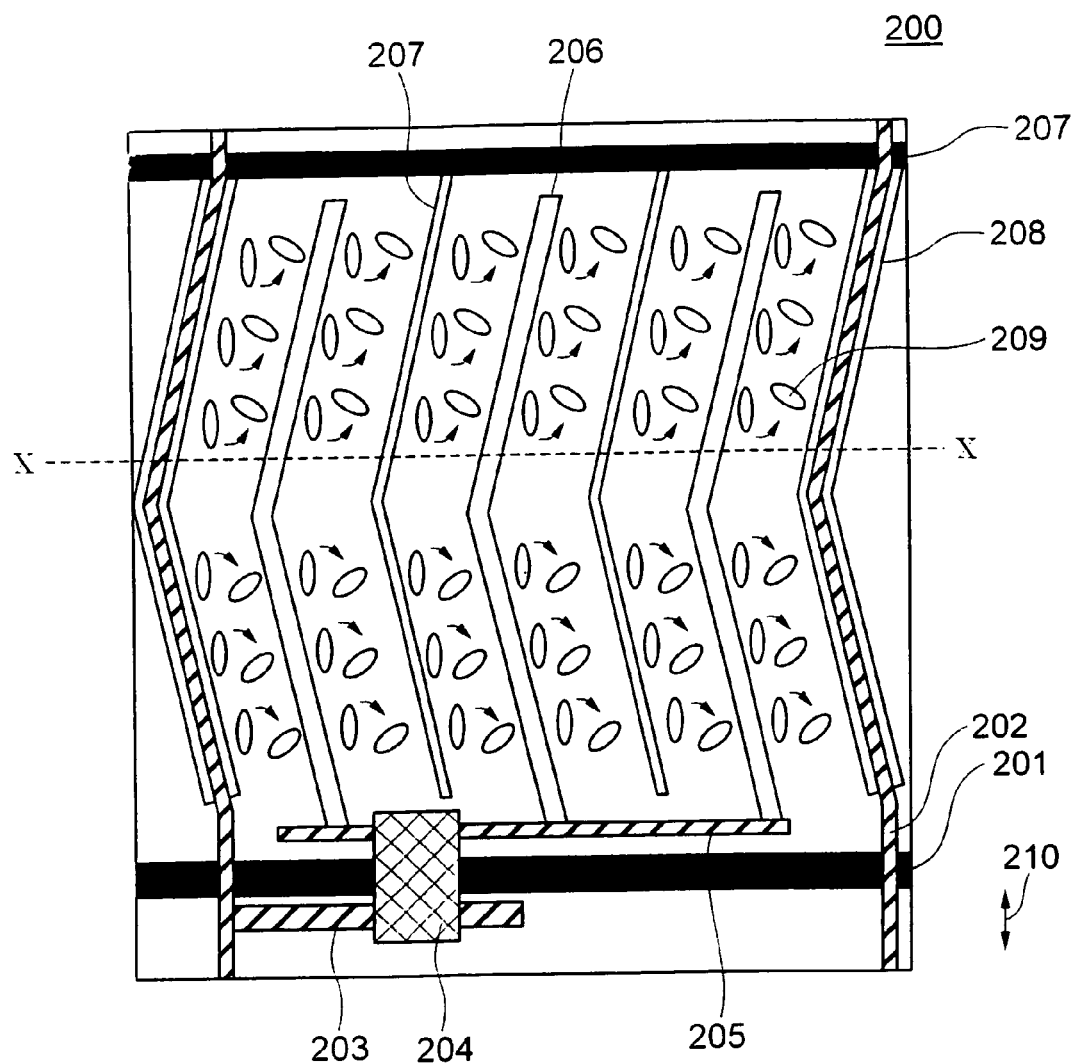
FIG. 9 is a top plan view showing the pixel of a conventional IPS-mode LCD device.
Figure 10:
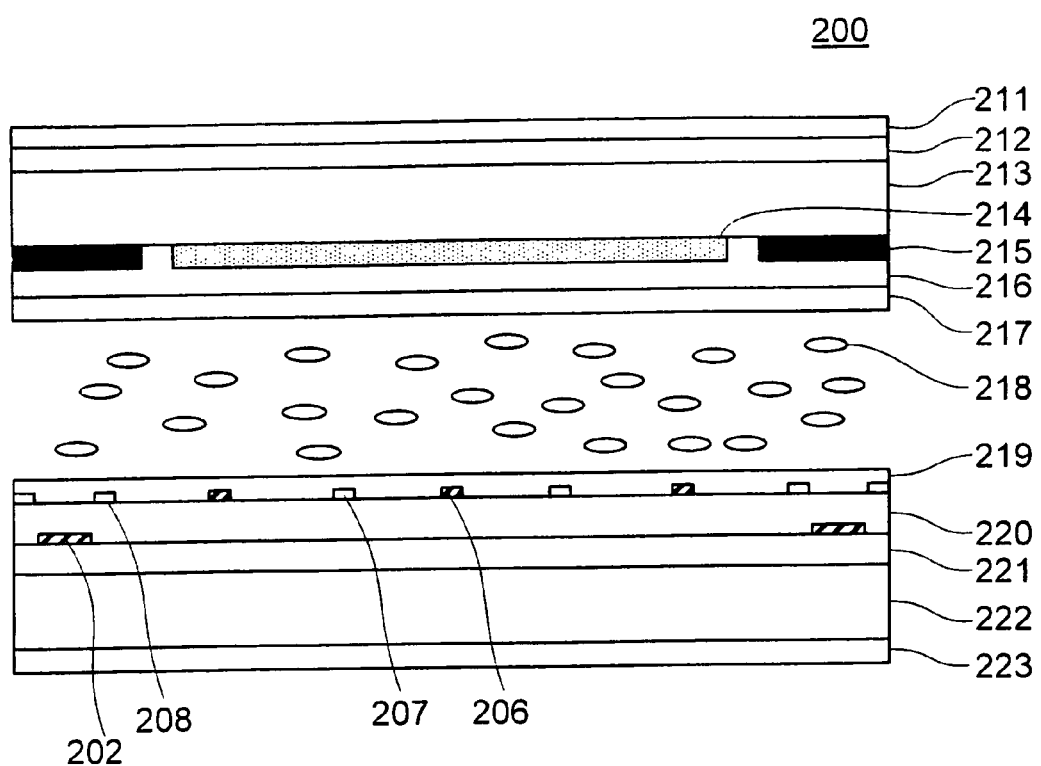
FIG. 10 is a sectional view taken along line X-X in FIG. 9.

In the present embodiment, the control electrodes 124-106 separate the pixel area into a plurality of domains without providing a dogleg bent as used in the conventional LCD device (FIG. 9). Thus, the direction of the comb-teeth electrodes of the pixel electrode 105 and the comb-teeth electrodes of the common electrode 106 can be made parallel to the optical axis of the LC molecules in the initial direction. Accordingly, in the rubbing treatment of the alignment film, the pixel electrode 105 and common electrode 106 do not cause an obstacle for the rubbing treatment. This reduces the leakage light upon display of a dark state. In addition, alignment of the extending direction of the electrodes with the optical axis of the polarizing films 111, 123 prevents an optical diffraction at the edge of the electrodes, and thus prevents deviation of the polarization direction, whereby the leakage light upon display of a dark state is further reduced. Thus, a LCD device having a higher contrast ratio can be obtained.

Further, since the extending direction of the pixel electrode 105 and common electrode 106 are parallel to the side of the pixel area defined by the data line 102, a dead space is not formed in the pixel area between the pattern of the first transparent electrode 122 and the pattern of the second transparent substrate 113. Thus, the effective aperture ratio of each pixel can be improved to increase the brightness of the LCD device and thus reduces the power dissipation thereof. Further, the arrangement of the electrodes prevents a short circuit failure between the comb-shaped pixel electrode and the comb-shaped common electrode, thereby improving the product yield of the LCD device.

Figure 3:
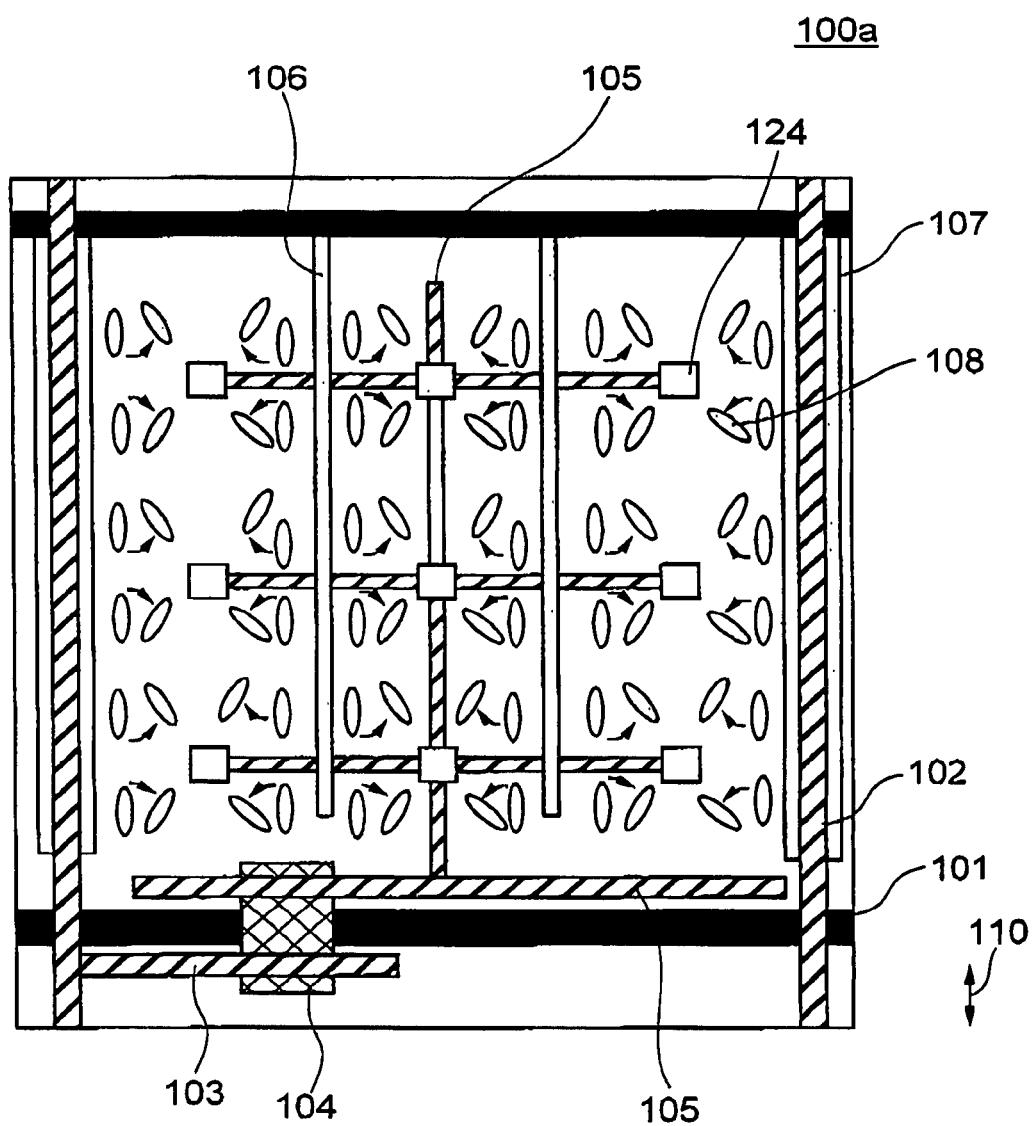
FIG. 3 is a top plan view showing the arrangement of electrodes in the pixel of a LCD device according to a second embodiment of the present invention.

FIG. 3 shows the arrangement of electrodes in the pixel of a LCD device according to a second embodiment in a top plan view. In the LCD device 100a of the present embodiment, the pixel electrode 105 made of a transparent film includes a trunk line extending parallel to the data line 102 and branch electrodes extending from the trunk line parallel to the gate electrode 101. The other configurations are similar to those in the first embodiment. A plurality of control electrodes 124 are formed to overlie the branches of the pixel electrode 105 and connected thereto via a contact hole.

The LCD device 100a of the present embodiment is such that the branches of the pixel electrode 105 extend perpendicular to the branches of the common electrode 106. The arrangement of the control electrodes 124 conforms with the arrangement of the branches of the common electrode 106, whereby the control electrodes 124 generate a radial electric field, similarly to the control electrodes in the first embodiment. Thus, the function of the present embodiment is similar to that of the first embodiment.

Figure 4:
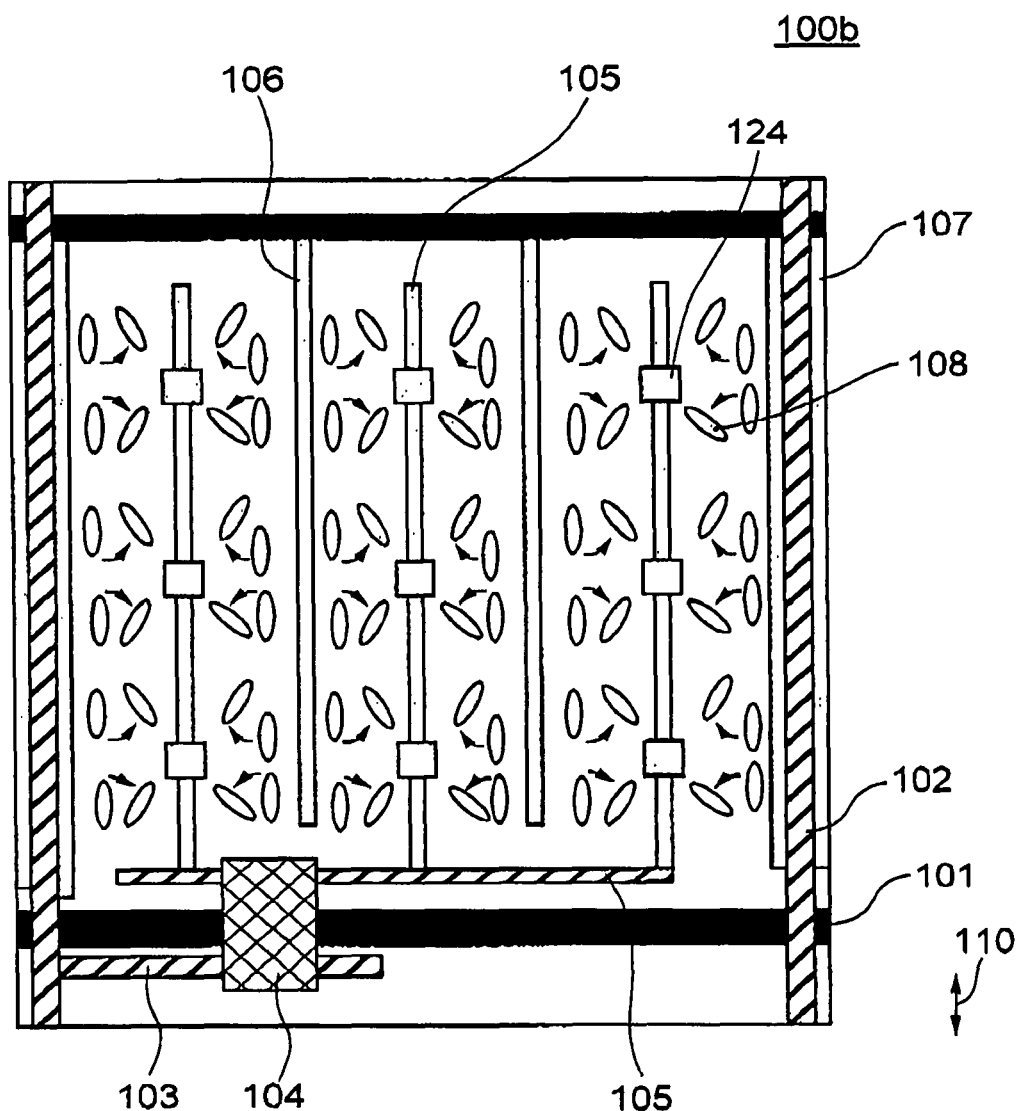
FIG. 4 is a top plan view showing the arrangement of electrodes in the pixel of a LCD device according to a third embodiment of the present invention.

FIG. 4 shows the arrangement of electrodes in the pixel of a LCD device according to a third embodiment of the present invention in a top plan view. The LCD device 100b of the present embodiment is such that the branches of the pixel electrode 105 are formed to overlie the overcoat 120 (such as shown FIG. 2), and the control electrodes 124 are configured as the same layer as the pixel electrode 105. Other configurations are similar to the configurations of the first embodiment In the present embodiment, the comb-teeth electrodes of the pixel electrode 105 are formed to overlie the overcoat 120, and thus the control electrodes 124 are formed as the same layer as the comb-teeth electrodes of the pixel electrode 105. In the present embodiment, the control electrodes 124 generate a second electric field which is slightly weaker than the second electric field in the relative relationship with respect to the first electric field in the first embodiment. However, the second electric field has a function of rotating the LC directors from the initial orientation toward the direction of the radial electric field. Thus, the control electrodes separate the pixel area into a plurality of domains, similarly to the first embodiment.

Figure 5:
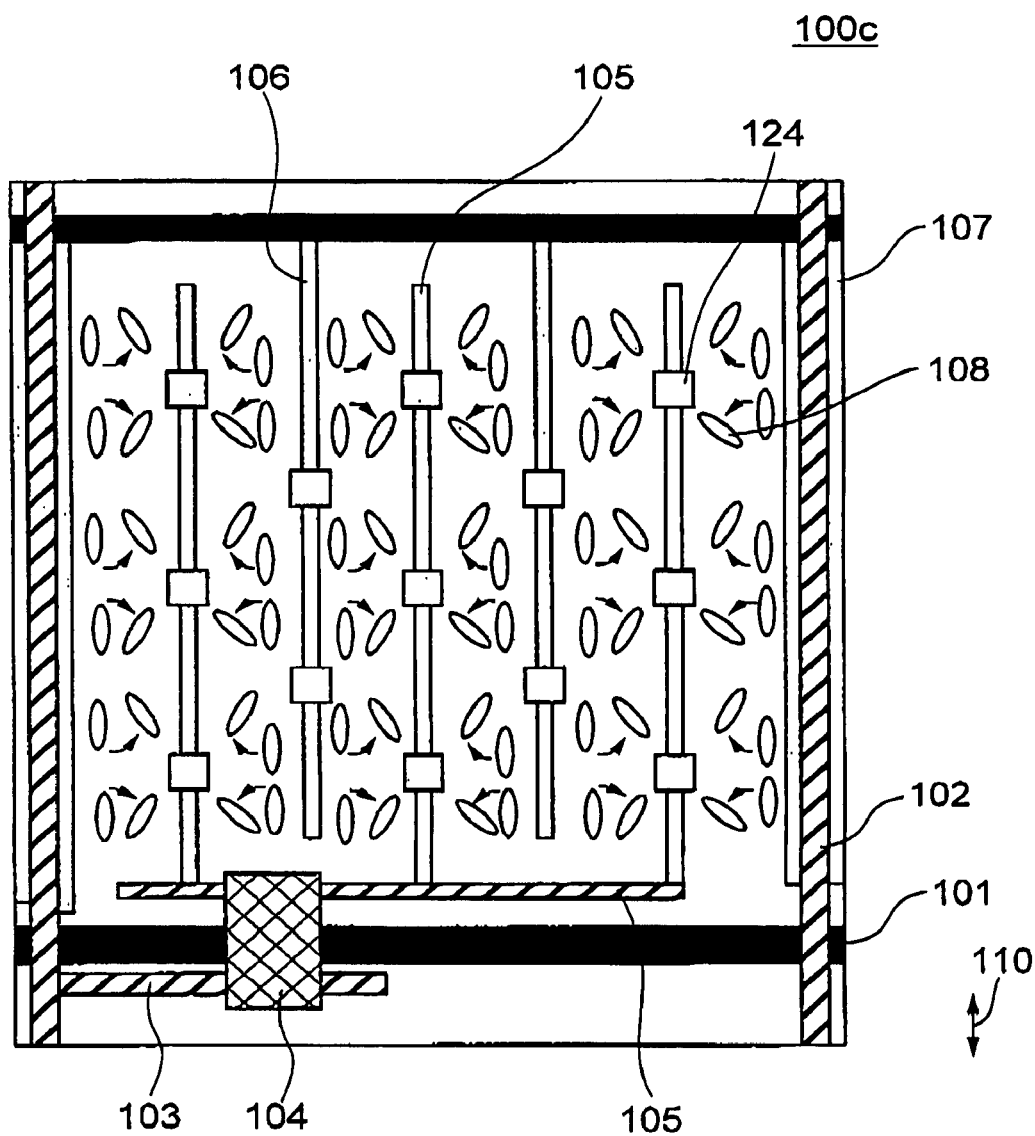
FIG. 5 is a top plan view showing the arrangement of electrodes in the pixel of a LCD device according to a fourth embodiment of the present invention.

FIG. 5 shows the arrangement of electrodes in the pixel of a LCD device according to a fourth embodiment of the present invention in a top plan view. The LCD device 100c of the present embodiment is such that control electrodes 124 are formed for both the pixel electrode 105 and common electrode 106. The control electrodes 124 are arranged in a staggered configuration, wherein the control electrodes 124 of the common electrode 106 are located on a line passing the center between adjacent control electrodes 124 of the pixel electrode 105 in the row direction. The function of the control electrodes 124 of the common electrode 106 is similar to that of the pixel electrode 105.

Figure 6:
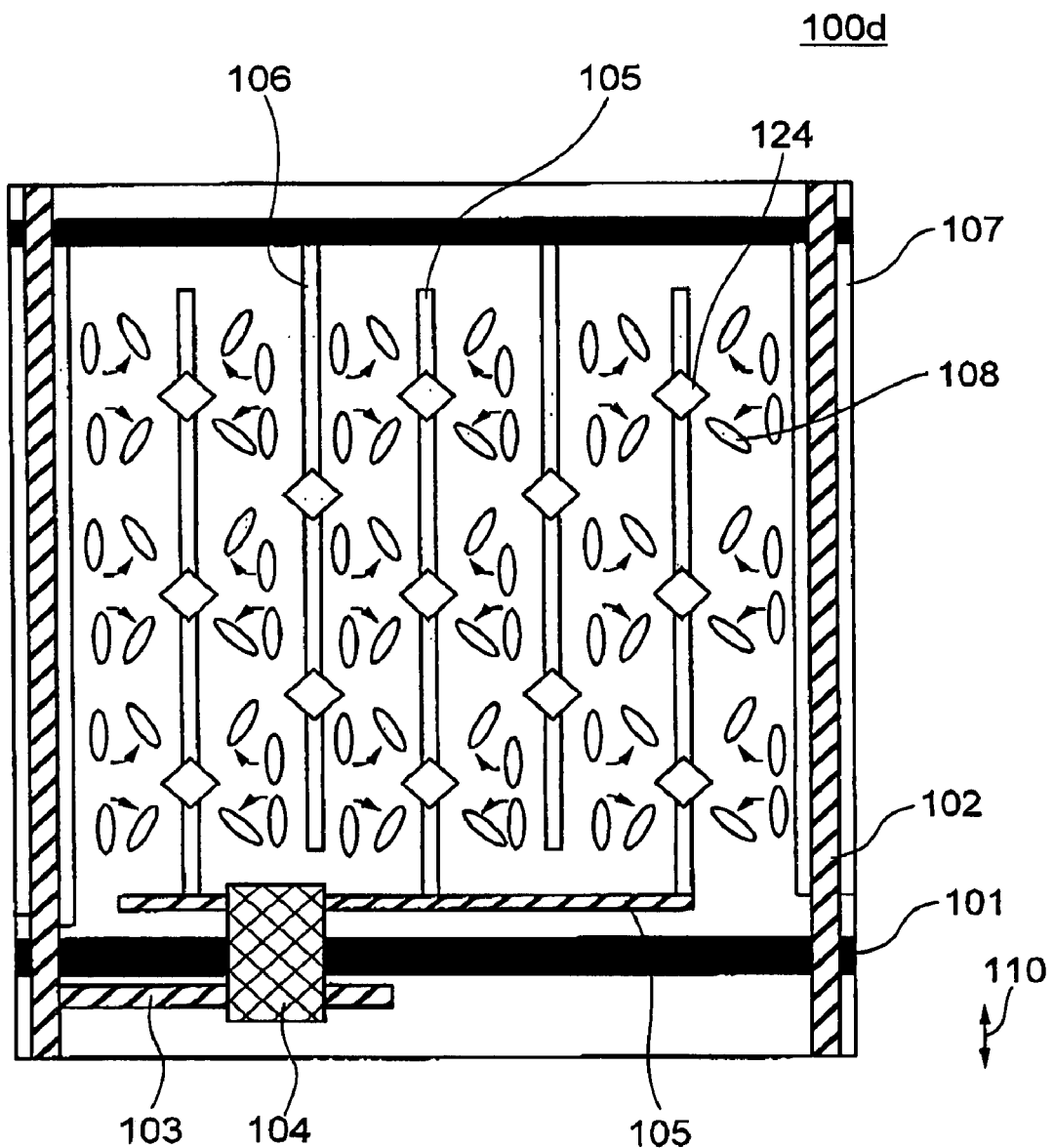
FIG. 6 is a top plan view showing the arrangement of electrodes in the pixel of a LCD device according to a fifth embodiment of the present invention.

FIG. 6 shows the arrangement of electrodes in the pixel of a LCD according to a fifth embodiment of the present invention in a top plan view. The LCD device 100d of the present embodiment is such that the control electrodes 124 is of a square shape having a diagonal line parallel to the column or row direction of the LCD device. The other configurations are similar to those of the fourth embodiment. The function of the control electrodes 124 is similar to that of the fourth embodiment.

Figure 7:
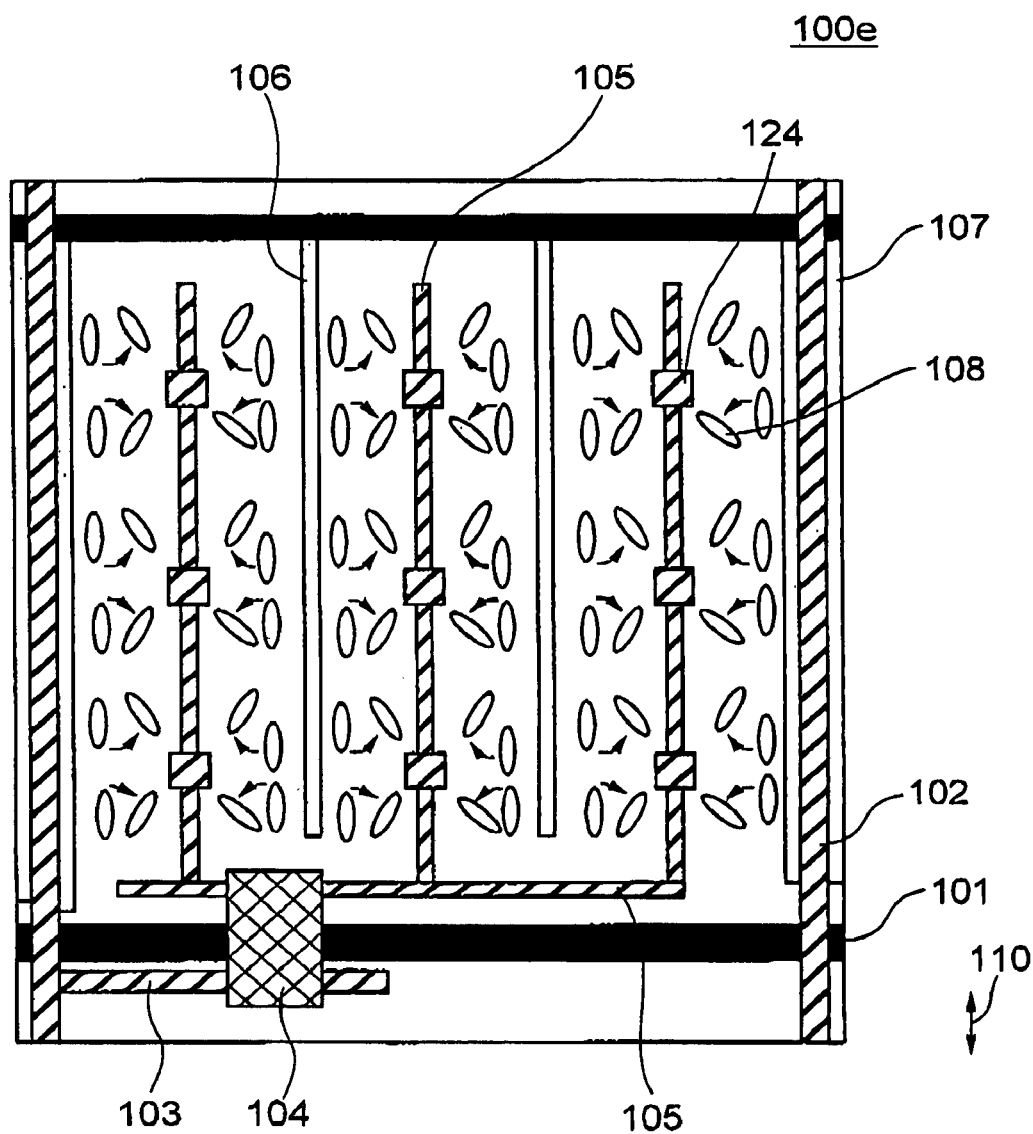
FIG. 7 is a top plan view showing the arrangement of electrodes in the pixel of a LCD device according to a sixth embodiment of the present invention.

FIG. 7 shows the arrangement of electrodes in the pixel of a LCD device according to a sixth embodiment of the present invention in a top plan view. The LCD device 10e of the present embodiment is such that the control electrodes 124 each are configured by a contact hole exposing the comb-teeth electrode of the pixel electrode 105, the contact hole having a size equivalent to the control electrodes in the first embodiment. The contact hole exposing therethrough the comb-teeth electrode has a function of increasing the electric field around the contact hole, similarly to the function of the transparent control electrodes 124 in the first embodiment.

Figure 8:
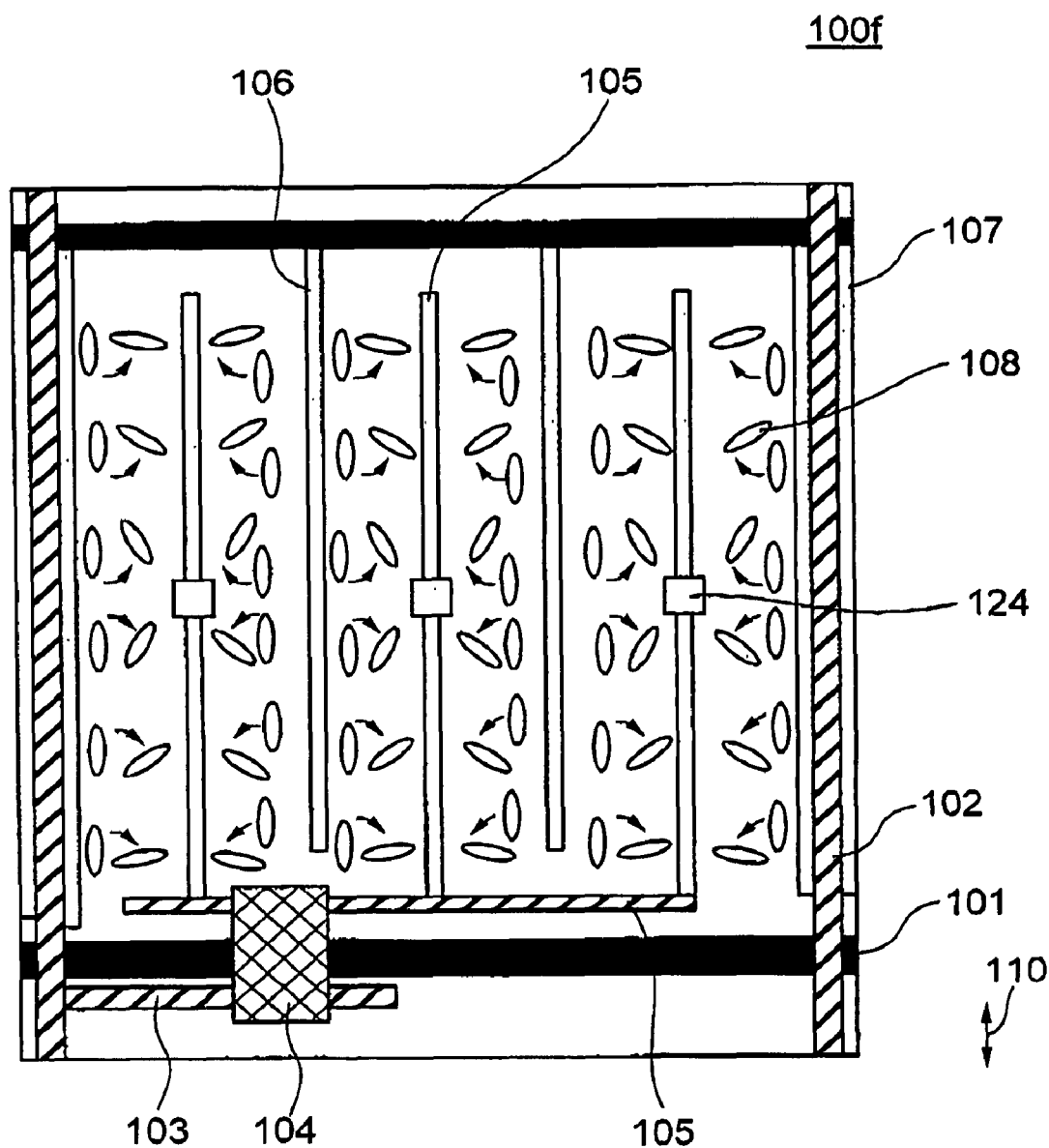
FIG. 8 is a top plan view showing the arrangement of electrodes in the pixel of a LCD device according to a seventh embodiment of the present invention.

FIG. 8 shows the arrangement of electrodes in the pixel of a LCD device according to a seventh embodiment of the present invention in a top plan view. The LCD device 100f of the present embodiment is such that the control electrodes 124 are arranged in a single row on the line passing through the center of the pixel. The other configurations are similar to those of the LCD device 100b of the third embodiment shown in FIG. 4. In the present embodiment, a smaller number of control electrodes 124 reduce the number of disclination lines, to thereby improve the optical efficiency.

In the above embodiments, a variety of shapes and arrangement are exemplified as the shape of the control electrodes. Since the function of the control electrodes divides the pixel area into a plurality of domains in each of which the LC directions have the same rotational direction, the shape and arrangement of the control electrodes are not limited to the above embodiments, and may be selected as desired so long as the control electrodes divide the pixel into a plurality domains. For example, the arrangement of each of the above embodiments may be combined with the arrangement of another of the above embodiments.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A liquid crystal display (LCD) device comprising:
    first and second substrates;
    a liquid crystal (LC) layer sandwiched between said first substrate and said second substrate, said first substrate defining an array of pixel areas, each of said pixel areas comprising a pixel electrode and a common electrode; and
    an insulator film formed on said first substrate and on said pixel electrode, the insulator film including a plurality of contact holes and said pixel electrode being exposed through each contact hole of said plurality of contact holes, said each contact hole being positioned above comb-teeth electrodes of said pixel electrode with predetermined intervals such that a voltage supplied to said pixel electrode generates a radial electric field around said each contact hole of said plurality of contact holes and between said pixel electrode and said common electrode so as to control a rotation direction of a LC director at each domain around said each contact hole separately,
    wherein said radial electric field is generated by and through said each contact hole.

2. The LCD device according to claim 1, wherein said LC layer is rotated in a plane parallel to a surface of said first substrate and a surface of said second substrate.

3. The LCD device according to claim 1, wherein said pixel areas are defined by a plurality of gate electrodes extending in a row direction and a plurality of data lines extending in a column direction, and
    wherein each of said pixel electrode and said common electrode has a trunk line and a plurality of transparent branch electrodes extending therefrom, said plurality of branch electrodes of said pixel electrode being exposed through said each contact hole.

4. The LCD device according to claim 3, wherein an initial orientation of said LC layer is parallel to said data lines.

5. The LCD device according to claim 3, wherein said trunk line of said common electrode underlies said transparent branch electrodes of said common electrode and said trunk line is connected to said transparent branch electrodes via an other contact hole formed in an insulator film, and said transparent branch electrodes of said pixel electrode underlie said insulator film.

6. The LCD device according to claim 3, wherein said insulator film is formed on said plurality of data lines.

7. The LCD device according to claim 6, further comprising:
    a pair of shield lines formed on said insulator film for shielding the LC layer from an electric field generated by a data line in said plurality of data lines.

8. The LCD device according to claim 1, wherein said radial field generated around said each contact hole divides said pixel area into a plurality of domains in which liquid crystal in the LC layer has the same rotational direction.

9. The LCD device according to claim 1, further comprising:
    an alignment film formed on the insulator film, the alignment film being formed in said each contact hole and on the pixel electrode.

10. The LCD device according to claim 1, wherein the pixel electrode includes a trunk line and a plurality of transparent branch electrodes extending from the trunk line, and said each contact hole is formed over the plurality of transparent branch, electrodes.

11. The LCD device according to claim 10, wherein the plurality of contact holes is formed on a transparent branch electrode of the plurality of transparent branch electrodes.

12. The LCD device according to claim 1, wherein the common electrode is formed on the insulator film.

13. The LCD device according to claim 1, wherein said each contact hole is formed in a surface of the insulator film and the common electrode is formed on the surface of the insulator film.

14. The LCD device according to claim 1, further comprising:
   an insulating film formed on the first substrate, the insulator film being formed on a surface of the insulating film and the pixel electrode being formed in said each contact hole on a the surface of the insulating film.

15. The LCD device according to claim 1, wherein said each domain is determined by said predetermined intervals, and an orientation direction of LC molecules is controlled separately in said each domain to become symmetric, with said each contact hole being a point of symmetry.

16. The LCD device according to claim 15, wherein said second substrate comprises a display surface, and said separately controlled orientation direction equalizes said rotation direction of said LC director against said display surface and compensates for a coloring caused by rotation of the LC directors.

17. The LCD device according to claim 1, further comprising:
   a plurality of data lines formed on the first substrate and extending in a column direction, the insulator film being formed on the plurality of data lines; and
   an alignment film formed on the insulator film, the alignment film being formed in the plurality of contact holes and on the pixel electrode.

18. The LCD device according to claim 1, wherein a contact hole of the plurality of contact holes has a width which is greater than a width of a comb-teeth electrode of the comb-teeth electrodes of said pixel electrode, and a depth of the contact hole is equal to a thickness of the insulator film.

19. The LCD device according to claim 1, further comprising:
   an insulating film formed on the first substrate, the insulator film being formed on the insulating film,
   wherein the common electrode comprises comb-teeth electrodes formed on an upper surface of the insulator film and the plurality of contact holes extend from an upper surface of the insulating film to the upper surface of the insulator film, and
   wherein the plurality of contact holes serve as a plurality of control electrodes for generating the radial electric field.

20. A liquid crystal display (LCD) device comprising:
   first and second substrates;
   a liquid crystal (LC) layer sandwiched between the first substrate and the second substrate, the first substrate defining an array of pixel areas, each of the pixel areas including a pixel electrode;
   an insulator film formed on the first substrate and on the pixel electrode, the insulator film comprising a plurality of contact holes including a contact hole formed over the pixel electrode; and
   a common electrode formed on the insulator film in the pixel areas, said plurality of contact holes being positioned above comb-teeth electrodes of said pixel electrode with predetermined intervals,
   wherein a voltage supplied to the pixel electrode generates a radial electric field around said plurality of contact holes and between the pixel electrode and the common electrode so as to control a rotation direction of a LC director at each domain around said plurality of contact holes separately, and
   wherein said radial electric field is generated by and through said plurality of contact holes.

* * * * *